Sept. 15, 1959  E. E. MONTGOLF ET AL  2,903,934
TUBE CUTTING APPARATUS WITH SIMULTANEOUSLY
ADJUSTABLE IDLER AND DRIVING ROLLS
Filed Sept. 16, 1957  2 Sheets-Sheet 2

INVENTORS
Earl Montgolf
Robert T. Smith, Jr.
Doyle R. Hudson,
BY
ATTORNEYS

United States Patent Office 2,903,934
Patented Sept. 15, 1959

2,903,934

TUBE CUTTING APPARATUS WITH SIMULTANEOUSLY ADJUSTABLE IDLER AND DRIVING ROLLS

Earl E. Montgolf and Robert T. Smith, Jr., Crossett, Ark., and Doyle R. Hudson, West Monroe, La., assignors to Textile Paper Products, Inc., Crossett, Ark., a corporation of Georgia Application September 16, 1957, Serial No. 684,348

7 Claims. (Cl. 164—60)

This invention relates to a machine designed particularly for cutting spirally wound paper cores having large diameters, heavy walls and long lengths.

Such cores have heretofore been cut with a radial cross-cut saw, the tube being laid on a bench and the saw drawn through it and locked. The tube is then rotated by hand to complete the cut. This practice is extremely slow, dangerous to the operator, and results in considerable variation in cut lengths as well as bias cuts since the large diameter saw blade which must be used has a tendency to follow the spirals in the core, twisting the blade, and causing a bias cut. In turning the core on a flat surface, by hand, which does not allow proper holding of the core, the core has a tendency to walk in the direction of the spiral wind causing variation in lengths cut.

Furthermore, in turning the core by hand it is impossible to attain a constant rate of turn so that the core is either being turned into the saw too rapidly or too slowly which adversely affects the quality of the cut attained. A variation around the cut end of the core is noticeable due to this variation in core turning speed, which in turn aggravates the bias cut condition.

A further objection to the above method is the fuzzing or burring of the section of core wall closest to the saw caused by friction against the portion of the saw blade itself between the teeth and bore. This fuzzing or burring effectively reduces the internal diameter of the core making it extremely hard to insert on a re-wind shaft.

A method of recutting paper cores having light wall thicknesses and small diameters universally used in the industry has not proven practical for these heavy wall, large diameter cores. This method has been to slip the paper core to be cut over a metal shaft of which the outside diameter is equivalent to the inside diameter of the tube. The metal shaft with the tube on it is then rotated. Circular knives mounted adjacent to this shaft, either power or friction driven, are then brought into contact with the tube to effect the re-cutting. With tubes or cores 8" in diameter or larger and lengths from 120" up, this method is impractical due to the weight and bulk of the metal shafts required to accommodate them since a different shaft is necessary for each diameter. Furthermore, the life of these shafts is short since the circular knives cut into them with each cut made, and it can be readily seen that continuous replacement of such large metal shafts would be impractical from a cost standpoint.

My machine was therefore designed to eliminate the slowness, danger and inaccuracy of the present methods used to re-cut large diameter, heavy wall paper cores and avoid the impractical expense of the conventional method of re-cutting cores.

The following features of my machine present special advantages:

(1) So that the paper core may be held securely, yet handled on and off the machine easily and turn freely, two idler rolls are mounted on a bed; the core rests on these rolls.

(2) Since the core must be rotated yet held securely enough to prevent walking due to the spirals, a specially designed rider roll is provided consisting of a series of individual driving stations linked together. Each station consists of four rubber covered rolls. One pair is mounted on the inboard and one pair on the outboard side of the machine, and the individual rolls of each pair are coaxially mounted on opposite sides of a supporting casting. Both inboard and outboard rolls are powered on 2 common shafts. When the rider roll assembly is brought into contact with the paper core these rubber covered rolls frictionally engage the outer skin of the core, and give positive driving action, as well as positive holding action to the core. The rider roll assembly is brought into contact with the core and released from the core by means of a single air cylinder mounted centrally of the assembly. By using this air cylinder the pressure necessary to hold this core securely can be controlled by the amount of air pressure put into the cylinder.

(3) The entire rider roll assembly is adjustable so as to accommodate a wide range of core diameters. This has been accomplished by mounting the rider roll assembly on knees so that it may be raised and lowered. The idler rolls are mounted on screws so as to be adjustably opposed to one another, opening and closing to accommodate varying core diameters. The means for adjusting both idler rolls and rider rolls are synchronized by means of an electric gear motor and a series of gear boxes. With the adjustable idler rolls and the specially designed rider rolls mounted on knees the machine takes a large variation in core diameters without the need of individual shafts for each diameter, holds the core securely between its idler rolls and rider rolls so as to prevent walking due to the spirals in the core, and the rider roll turns the core at a constant speed so that exact cut lengths may be secured.

(4) To prevent the twisting of the saw blade encountered in the present method of cutting large diameter, heavy wall cores due to the tendency of the large diameter blade to follow the spiral lines in the core, it is necessary to use a small diameter saw blade, and in order to prevent the scuffing or burring of the core wall by friction against the flat surface of the blade it is desirable to have only its teeth enter the core wall. These problems are solved by mounting an 8" saw blade on an air cylinder which can move this blade into contact with the tube wall at a predetermined rate but still exert enough pressure to effect a cut, by putting flanges around the blade sufficiently large to reinforce it, and by adjusting the stroke of the air cylinder so that only the teeth of the saw entered the core wall.

(5) The entire saw assembly is mounted below the core so that it may be housed, eliminating any danger to the operator from the turning saw blade. The operation of the rider roll air cylinder and that of the saw blade air cylinder are timed so that it is impossible to accidentally engage the saw before the core was held securely by the rider roll, thus providing additional operator safety.

(6) The use of two saw pistons 48" apart is necessary to prevent excessive overhang of a given core over either end of the machine bed. When cutting short lengths of a core (up to 36") from a full length core the forward saw station is used, when cutting long lengths (over 36") from a full length core the center station is used. One station is used at a time and selection of station is made by valves which direct air to the desired cylinder and cut it off from the other.

A preferred embodiment of my invention will now be described with reference to the accompanying drawings, in which:

Figure 4 is a digrammatic sketch showing the four-way valve control for the air cylinders.

Like reference numerals denote like parts throughout the several views.

Figure 1:
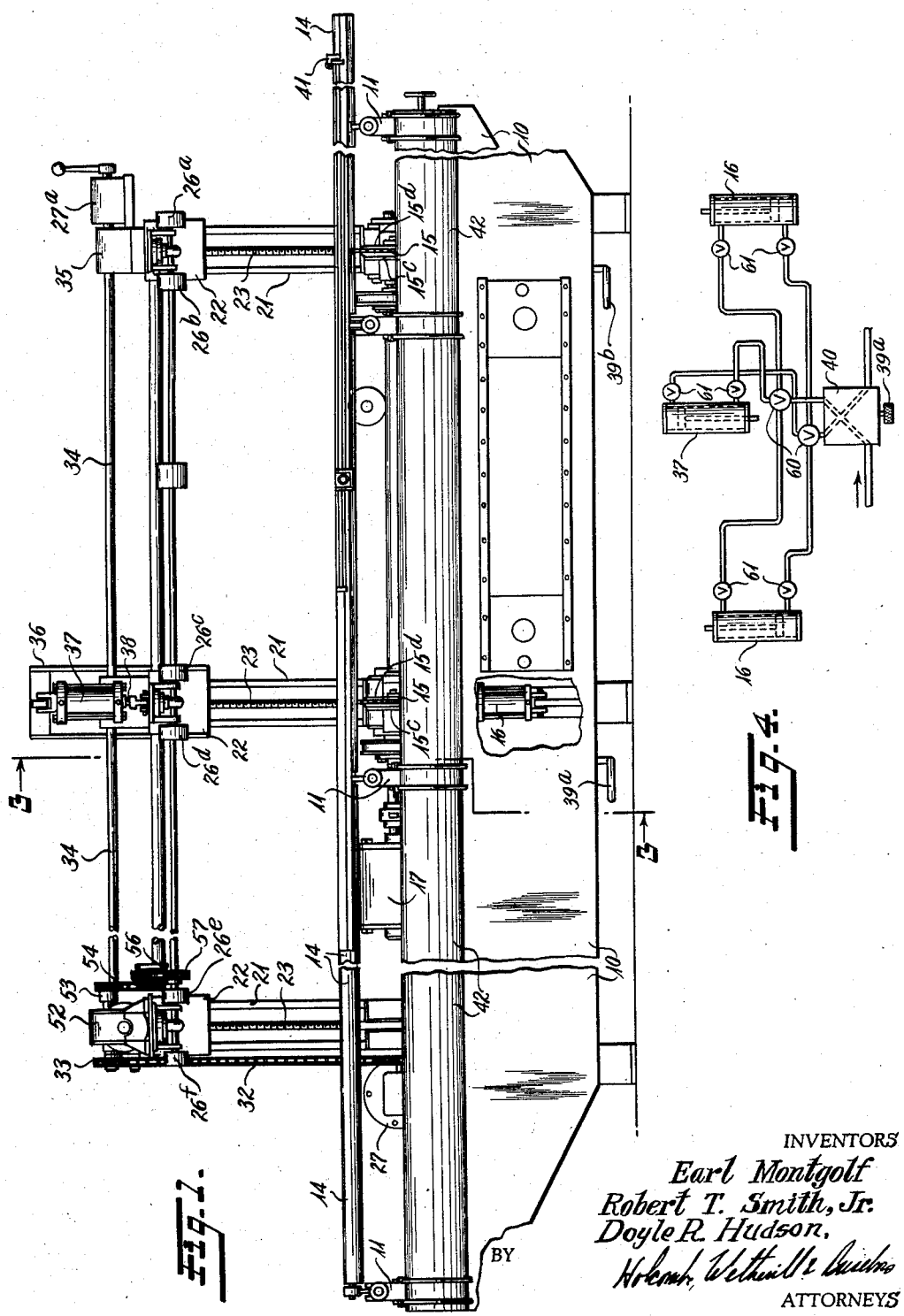
Figure 1 is a side elevation showing the entire machine.
Figure 2:
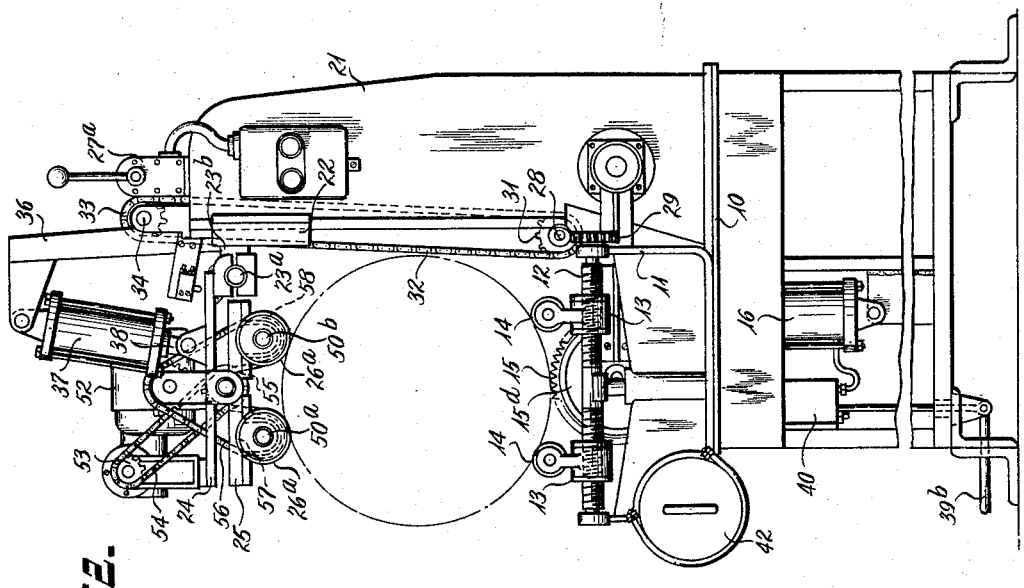
Figure 2 is an end view of the machine.
Figure 3:
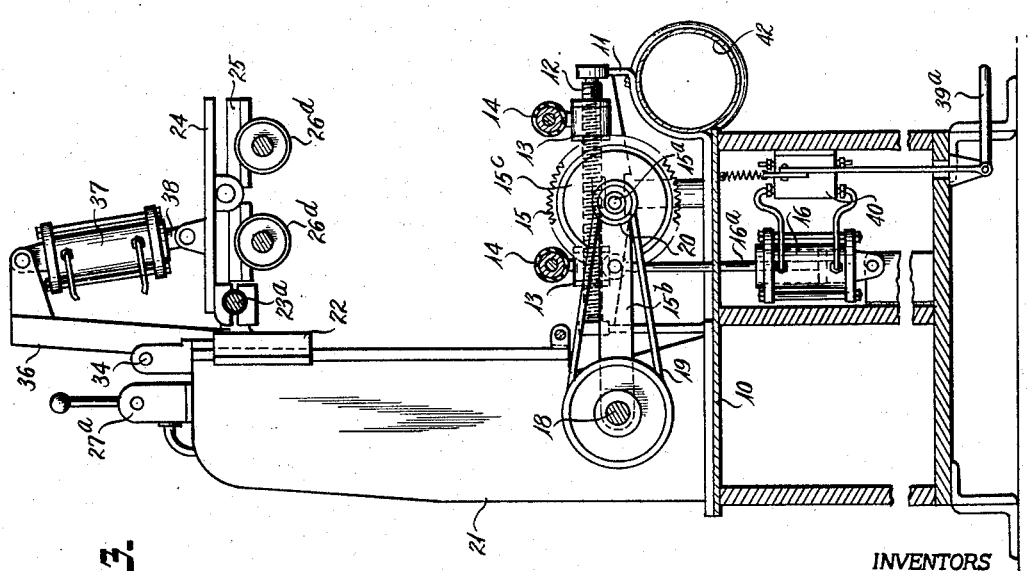
Figure 3 is a cross-sectional view taken along the line III—III of Figure 1.

As shown in these drawings the machine is supported on an elongated bench or table 10, and comprise the three stations shown in Figures 1, 2 and 3 respectively. Each end of the table and the central station are provided with a pair of vertical supports 11 in which a screw-threaded idler roll spring rod 12 is journalled. The threads on one half of each rod are right-handed and on the other half left-handed, so that when the rods 12 are turned the two internally screw-threaded riders 13 which are mounted on each of them are forced either towards each other or away from each other. Each rider 13 carries one end of an idler roll 14 which is so mounted as to rotate freely in the rider.

A rotary saw blade 15 is mounted at each of the stations shown at the center and right of Fig. 1. As best seen in Fig. 3, each saw blade is fixed to a stub shaft 15a journalled in a swinging saw frame 15b. In one end of this frame a countershaft 18 carried by the table 10 and driven by a motor 17 is journalled, so that the saw frame can pivot about the shaft. The other end of the saw frame can pivot about the shaft. The other end of the saw frame is pivotally connected to the upper end of the piston rod 16a of the air cylinder 16, so that the frame 15b may be raised or lowered at will. A belt 19 passes about the countershaft 18 and a pulley 20 fixed to the stub shaft 15a, thus driving the saw blade 15. Two metal plates 15c and 15d reinforce the two sides of this blade up to a distance from its edge just less than the depth of the cut the blade is intended to make.

The vertical posts 21 are mounted on the table at each station. Blocks 22 are slidably carried by each pair of posts and screw threaded to receive a lifting screw 23 mounted in the table 10, rotation of which raises and lowers the blocks 22. A single shaft 23a is fixed to each block 22 by means of brackets 23b and one end of an arm 24 at each station is pivotally mounted on this shaft. A rider roll carrier 25 is pivotally suspended from the arm 24. Six pairs of parallel rubber covered rolls, 26a, 26b, 26c, 26d, 26e, 26f are carried on shafts 50a, 50b journalled in these carriers. Both inboard and outboard shafts are driven by gear motor 52 mounted on the carrier 25, through sprocket wheel 53, chain 54, sprocket wheel 55, chain 56, and sprocket wheels 57, 58 fixed to shafts 50a and 50b, respectively. A gear motor 27 near one end of the table is electrically controlled by the reversing switch 27a and drives the shaft 28, which turns the threaded rods 12 through worm gearing 29 fixed to the shaft 28 and spur gears 30 fixed to the rods 12, so as to vary the distance between the idler rolls 14a and 14b.

Sprocket wheel 31 fixed to the shaft 28 drives the chain 32 which in turn drives the sprocket wheel 33, and the shaft 34 to which it is fixed. The shaft 34 acts through mitregear boxes 35 at each station to turn the screws 23, thus raising or lowering the rider roll assembly as the idler rolls are separated or brought closer together.

The relationship between the gearing 29, 30 which actuates the threaded rods 12, and the mitre gearing 35 which actuates the screws 23 is such that the bottom of the core to be cut always rests at the same level, regardless of its size.

The central vertical post 21 extends upwardly to form an air cylinder carrying cage 36, from which the working chamber of the air cylinder 37 is pivotally suspended. The lower end of the piston rod 38 is pivotally connected to the rider roll carrier 24. Expansion of the cylinder pivots the carrier and its rolls about the shaft 23a and brings the belts 31, 31a, into engagement with the roll to be cut. The air cylinder may be operated by means of either the foot pedals 39a and 39b associated with the two cutting stations, through a fourway valve 40. Actuation of this valve 40 admits air to cylinder 37, to speed regulator valves 60 (Figure 4) acting as time delay devices and thence to the air cylinder 16 at the selected station, thus raising the saw blade 15 into cutting position, only after the rider rolls are in driving position. The rolls 26a, 26b, 26c, 26d, 26e, 26f, then turn the roll to be cut and hold it down in cutting position, with its lower portion between the idler rolls 14. As soon as the cut has been completed the operator releases the foot pedal 39, reversing the four-way valve, and contracting the two air cylinders 37 and 16, the rider roll assembly moves up and the saw is lowered an instant later.

Shut off valves 61 are provided between each cylinder and the four-way valve, so that either station may be operated without actuating the moving parts specific to the other station.

An adjustable target stop 41 may be provided so that a large number of successive cores may be cut to the same length simply by butting them against the stop.

A dust collector pipe 42 should also be attached to the table 10.

What we claim is:

1. Apparatus for cutting a hollow spirally wound core comprising a pair of elongated parallel, rotatable, core supporting idler rolls, at least one pair of parallel upper rolls pivotally mounted at longitudinally spaced points on a plurality of common vertically adjustable carrier means, means for driving at least one of said upper rolls, means for simultaneously varying the horizontal distance between said idler rolls and the vertical distance between said carrier means and said idler rolls, a vertically adjustable circular saw positioned beneath and between said idler rolls, means for lifting said saw into cutting engagement with said core, means for pivoting said upper rolls about their carrier means to bring them into driving engagement with said core at a plurality of longitudinally spaced points to force it into rotation, and actuating means controlling both the saw lifting and upper roll pivoting means.

2. Apparatus as claimed in claim 1 in which said means for driving said upper rolls comprises a separate motor acting on said upper rolls through a chain drive.

3. Apparatus as claimed in claim 1 in which said upper rolls are first pivoted downward and said saw is brought into cutting position only after they have begun to rotate the core.

4. Apparatus as claimed in claim 1 in which said means for pivoting said upper rolls comprises a fluid pressure system, and the pressure exerted thereby may be varied by said actuating means.

5. Apparatus as claimed in claim 1 in which said carrier means are mounted on a plurality of vertical screws, said lower rolls are carried by horizontal screws, and both vertical and horizontal screws are driven by a single motor.

6. Apparatus as claimed in claim 5 in which said single motor drives said vertical and horizontal screws through separate gear means so proportioned that the lowest point on any core which the machine is adapted to cut and which is mounted on the idler rolls is positioned at the same height, regardless of the size of the rolls.

7. Apparatus as claimed in claim 1 comprising a plurality of cutting stations, each provided with its individual saw, a plurality of pairs of upper rolls, each pair mounted in carrier means at each end, the means for varying the vertical distance between said upper and idler rolls comprising a single motor which moves all of said carriers simultaneously through a single shaft and separate gear boxes for each carrier, and the means for raising the saws being adapted to lift either saw independently.

References Cited in the file of this patent

UNITED STATES PATENTS

| | | |
|---|---|---|
| 1,348,636 | Fretter | Aug. 13, 1920 |
| 1,468,935 | Vosper | Sept. 25, 1923 |
| 1,594,533 | Lally | Aug. 3, 1926 |
| 1,765,208 | Cunningham | June 17, 1930 |

FOREIGN PATENTS

| | | |
|---|---|---|
| 567,899 | Great Britain | Mar. 7, 1945 |
| 735,975 | Great Britain | Aug. 31, 1955 |